US012053988B2

(12) United States Patent
Kubota

(10) Patent No.: US 12,053,988 B2
(45) Date of Patent: Aug. 6, 2024

(54) MEMORY AND CARTRIDGE

(71) Applicant: SEIKO EPSON CORPORATION, Tokyo (JP)

(72) Inventor: Tomoo Kubota, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 101 days.

(21) Appl. No.: 17/889,055

(22) Filed: Aug. 16, 2022

(65) Prior Publication Data

US 2023/0056765 A1 Feb. 23, 2023

(30) Foreign Application Priority Data

Aug. 17, 2021 (JP) ................................ 2021-132523

(51) Int. Cl.
*B41J 2/175* (2006.01)

(52) U.S. Cl.
CPC ......... *B41J 2/17546* (2013.01); *B41J 2/1752* (2013.01); *B41J 2/17523* (2013.01); *B41J 2/17526* (2013.01); *B41J 2/1753* (2013.01); *B41J 2/17553* (2013.01); *B41J 2/17566* (2013.01); *B41J 2/17509* (2013.01)

(58) Field of Classification Search
CPC .. B41J 2/17546; B41J 2/1752; B41J 2/17523; B41J 2/17526; B41J 2/1753; B41J 2/17553; B41J 2/17566; B41J 2/17509
See application file for complete search history.

(56) References Cited

U.S. PATENT DOCUMENTS

2002/0135624 A1* 9/2002 Naka ..................... B41J 29/393 347/7

FOREIGN PATENT DOCUMENTS

| | | | | |
|---|---|---|---|---|
| JP | 2004188635 A | * | 7/2004 | .............. B41J 2/175 |
| JP | 2007-071910 A | | 3/2007 | |

* cited by examiner

*Primary Examiner* — Yaovi M Ameh
(74) *Attorney, Agent, or Firm* — Oliff PLC

(57) ABSTRACT

A memory includes: a first type storage area used in a one-time use period from when a liquid is filled into a cartridge to when consumption of the liquid is completed; and a second type storage area used in an entire use period of the cartridge, which is a set of one-time use periods, in which the first type storage area has a plurality of individual areas in which a different area is used in each one-time use period.

9 Claims, 12 Drawing Sheets

MEMORY AND CARTRIDGE

The present application is based on, and claims priority from JP Application Serial Number 2021-132523, filed. Aug. 17, 2021, the disclosure of which is hereby incorporated by reference herein in its entirety.

BACKGROUND

1. Technical Field

The present disclosure relates to a technology of a memory attached to a cartridge.

2. Related Art

In the related art, a technology of a reusable cartridge having a memory has been known (JP-A-2007-71910).

In the technology of the related art, when the cartridge is not used, initial value data that has been stored in the memory is read from a storage unit of a cartridge recycling system, and written into the memory at the time of reusing the cartridge. The initial value data is data that may be changed by a storage device, such as a residual toner quantity. When the data stored in the memory is rewritten by the storage device according to a use status of the cartridge, the number of rewritings of data into the memory is increased in the memory attached to the reusable cartridge. As a result, the memory may be deteriorated. When the memory is deteriorated, a defect that the data cannot be correctly stored may occur.

SUMMARY (1) According to a first aspect of the present disclosure, there is provided a memory attached to a cartridge that is configured to be reusable by completing consumption of a liquid and then filling the liquid thereinto again. The memory includes: a first type storage area used in a one-time use period from when the liquid is filled into the cartridge to when the consumption of the liquid is completed; and a second type storage area used in an entire use period of the cartridge, which is set of one-time use periods, in which the first type storage area has a plurality of individual areas in which a different area is used in each one-time use period.

(2) According to a second aspect of the present disclosure, there is provided a cartridge. The cartridge includes: a liquid accommodating portion accommodating a liquid; a liquid supply portion supplying the liquid in the liquid accommodating portion; and the memory described in the aspect.

DESCRIPTION OF EXEMPLARY EMBODIMENTS

A. Embodiment

Figure 1:
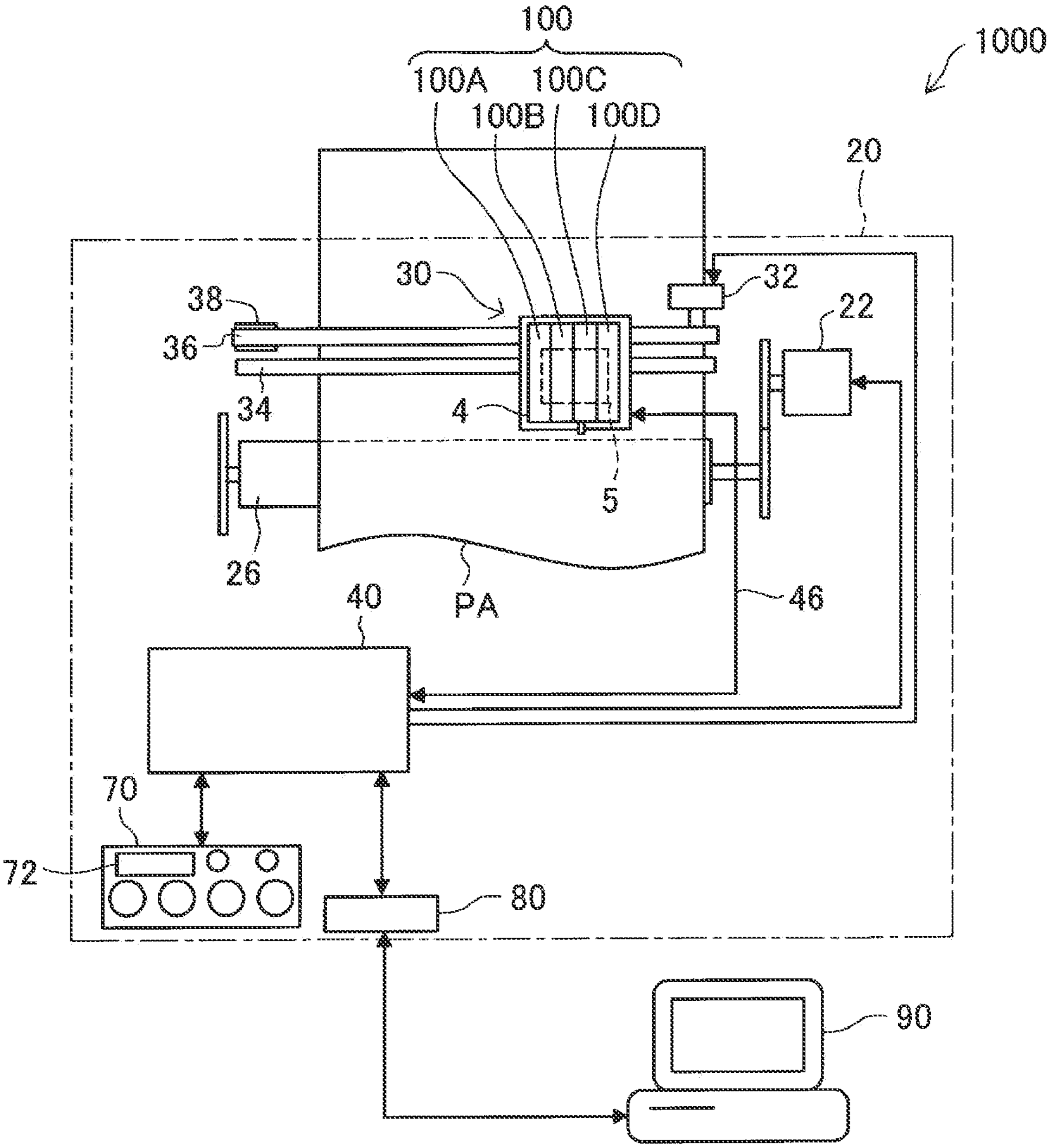
FIG. 1 is an explanatory view illustrating a schematic configuration of a printing system.

FIG. 1 is an explanatory view illustrating a schematic configuration of a printing system 1000 as an embodiment of the present disclosure. The printing system 1000 includes a printing device 20, a plurality of cartridges 100 detachably mounted in the printing device 20, and a computer 90. The printing device 20 is an ink jet printer that performs printing by discharging ink as a liquid to a printing medium PA. The printing device 20 is connected in data communication with the computer 90 via a connector 80.

The printing device 20 includes a sub-scan feed mechanism, a main scan feed mechanism, a head drive mechanism, and a device control unit 40. The sub-scan feed mechanism includes a paper feed motor 22 and a platen 26, and transmits rotation of the paper feed motor 22 to the platen 26 to transport the printing medium PA in a sub-scanning direction. The sub-scan feed mechanism includes a carriage motor 32, a pulley 38, a driving belt 36 stretched between the carriage motor 32 and the pulley 38, and a sliding shaft 34 provided in parallel with a shaft of the platen 26. The sliding shaft 34 slidably holds a carriage 30 fixed to the driving belt 36. Rotation of the carriage motor 32 is transmitted to the carriage 30 via the driving belt 36, and the carriage 30 reciprocates in the sub-scanning direction, which is a shaft direction of the platen. 26, along the sliding shaft 34. The head drive mechanism includes the carriage 30. The carriage 30 includes a mounting portion 4 capable of mounting the cartridge 100, a print head 5 discharging ink, a liquid introduction portion 6 illustrated in FIG. 6 described below, a connection mechanism 400 illustrated in FIG. 6 described below, and a sub-control board 500 illustrated in FIG. 6 described below. The head drive mechanism drives the print head 5 of the carriage 30 to discharge the ink onto the printing medium PA.

The device control unit 40 controls the above-described mechanisms to realize a printing process. The device control unit 40 is electrically coupled with the sub-control board 500 (described below) of the carriage 30 via a bus 46, The device control unit 40 receives, for example, a printing job of a user via the computer 90, and controls the above-described mechanisms to perform a printing operation based on contents of the received printing job. In addition, the device control unit 40 performs mounting determination on whether or not the cartridge 100 is mounted in the mounting portion 4 or performs data communication with a circuit board 120.

The mounting portion 4 of the carriage 30 can detachably mount the plurality of cartridges 100. That is, the cartridge 100 supplying the ink as a liquid to the print head 5 is attachably and detachably provided in the mounting portion 4 of the carriage 30 by a user's operation. In the present embodiment, four cartridges 100 can be mounted in the mounting portion 4. Different colors or types of ink are accommodated in four cartridges 100. When the plurality of cartridges 100 are used in a distinguished manner, reference signs 100A, 100B, 100C, and 100D are used, respectively. Each of the four cartridges 100A to 100D is mounted at a predetermined mounting position of the mounting portion 4. In other embodiments, the number of cartridges 100 that can be mounted in the mounting portion 4 is not limited to four, and may be more or less than four. The printing device 20 further includes an operation unit 70 that performs various settings of the printing device 20 by the user or checks a status of the printing device 20. The operation unit 70 includes a display unit 72 for displaying various information such as statuses of the printing device 20.

In the present embodiment, the printing system 1000 is of a so-called on-carriage type in which the cartridge 100 is mounted in the mounting portion 4 of the carriage 30, but is not limited thereto. For example, the printing system 1000 may be of a so-called off-carriage type in which the cartridge 100 is mounted in the mounting portion that is located at another place different from the carriage 30.

Figure 2:
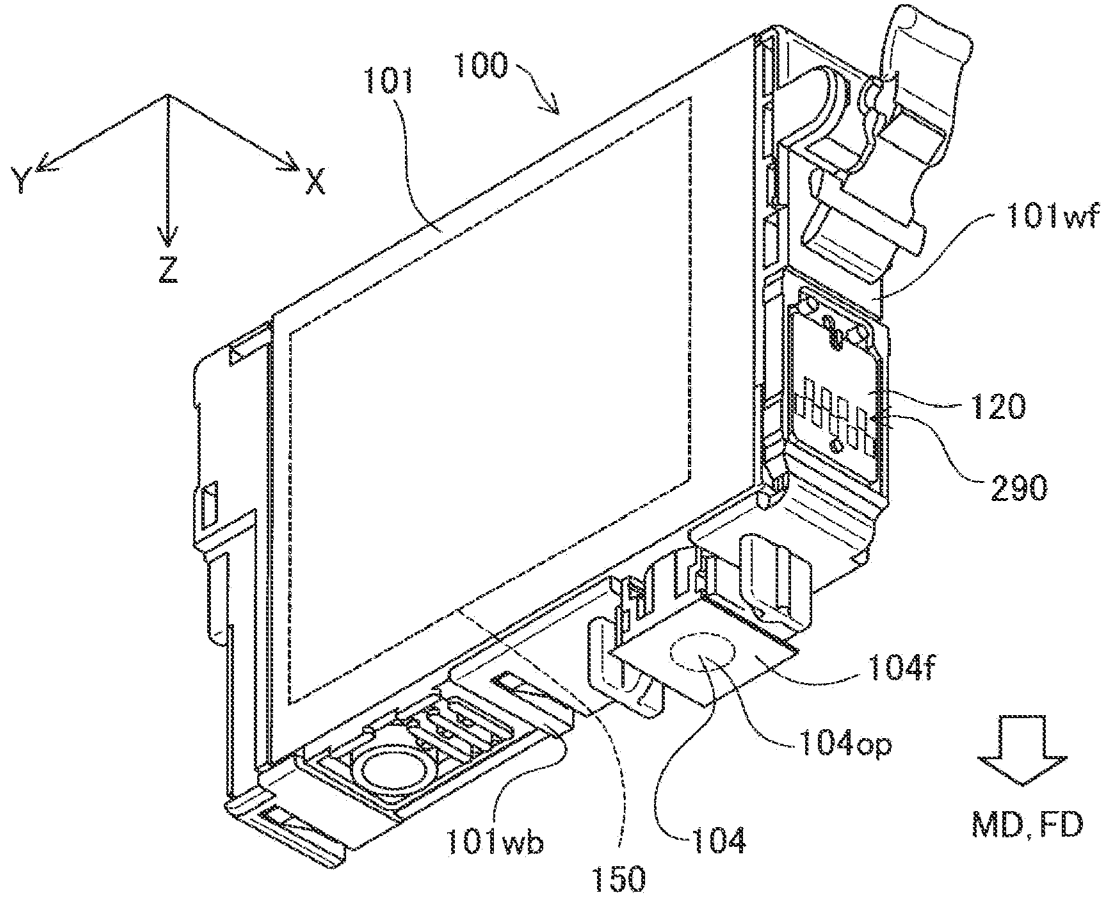
FIG. 2 is a first perspective view illustrating a configuration of a cartridge.
Figure 3:
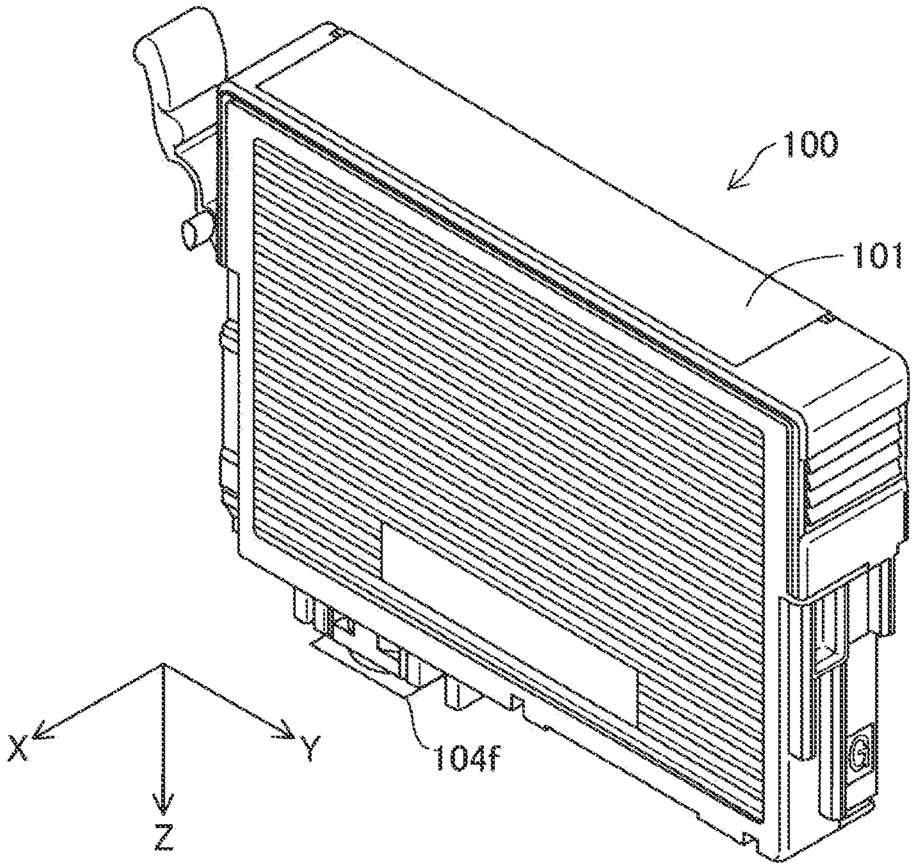
FIG. 3 is a second perspective view illustrating the configuration of the cartridge.

A configuration of the cartridge 100 will be described with reference to FIGS. 2 and 3. FIG. 2 is a first perspective view illustrating the configuration of the cartridge 100. FIG. 3 is a second perspective view illustrating the configuration of the cartridge 100. An X axis, a Y axis, and a Z axis orthogonal to one another are illustrated in drawings after FIG. 2, as needed. Directions in which arrows of the X axis, the Y axis, and the Z axis are directed indicate positive directions along the X axis, the Y axis, and the Z axis, respectively. The positive directions along the X axis, the Y axis, and the Z axis are denoted by a +X direction, a +Y direction, and a +Z direction, respectively. The reverse directions of the directions in which the arrows of the X axis, the Y axis, and the Z axis are directed are negative directions along the X axis, the Y axis, and the Z axis, respectively. The negative directions along the X axis, the Y axis, and the Z axis are denoted by a −X direction, a −Y direction, and a −Z direction, respectively. Directions along the X axis, the Y axis, and the Z axis regardless of whether being positive or negative are called an X direction, a Y direction, and a Z direction, respectively. The same applies to the figures and descriptions to be described later. The X, Y, and Z axes drawn in other drawings correspond to the X-axis, Y-axis, and Z-axis directions in FIG. 2. The X-axis, Y-axis, and Z-axis directions for the cartridge 100 are based on a state in which the printing device 20 is disposed on a horizontal plane parallel to the X direction and the Y direction and the cartridge 100 is mounted in the printing device 20.

Figure 6:
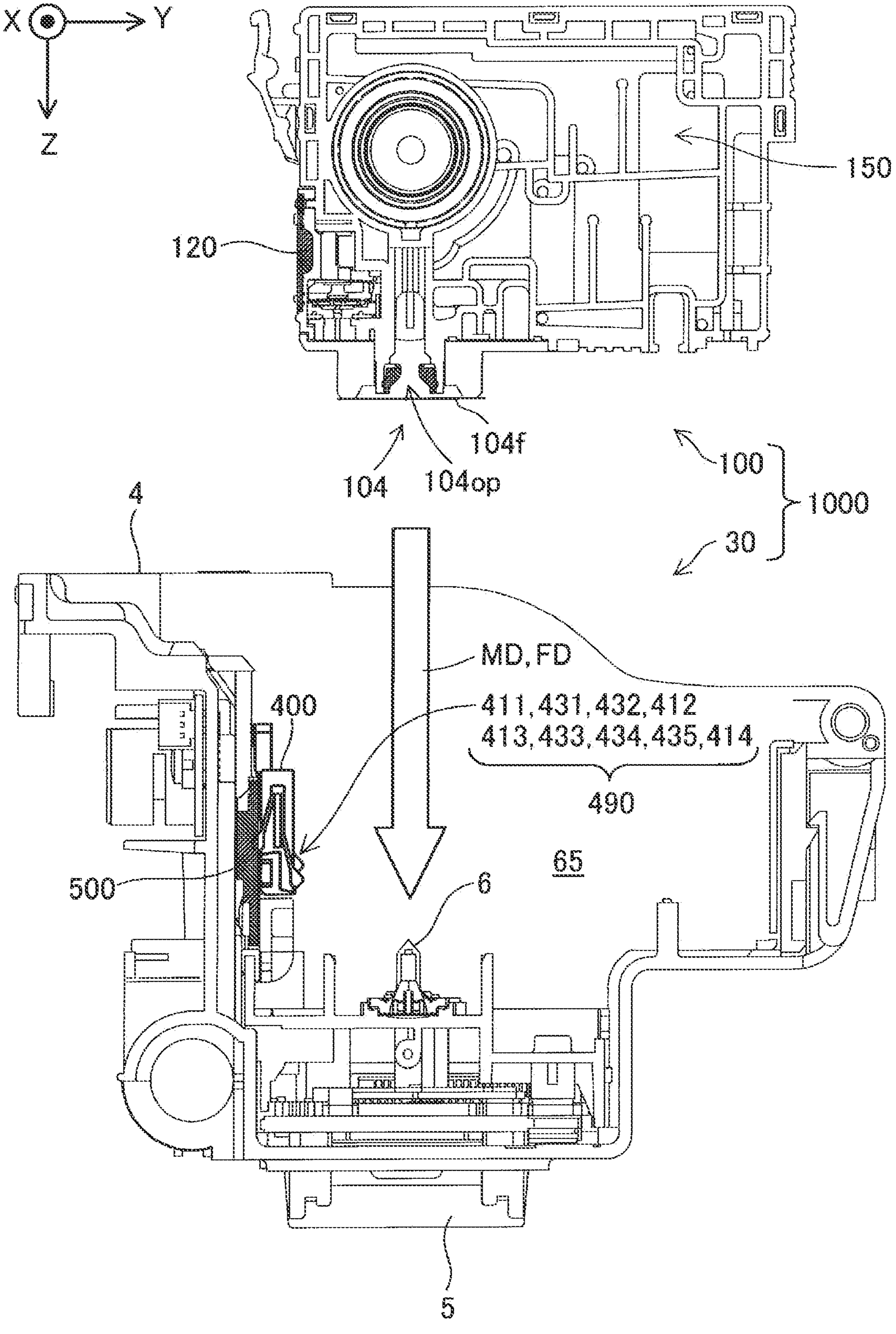
FIG. 6 is a diagram illustrating a state in which the cartridge is mounted in a mounting portion of the carriage.

As illustrated in FIGS. 2 and 3, an appearance shape of the cartridge 100 is a substantially rectangular parallelepiped. As illustrated in FIG. 2, the cartridge 100 includes a main body 101 forming an outer shell, and the circuit board 120 attached to the main body 101. The main body 101 includes a front wall 101*wf* which is a wall on the −Y direction side and a bottom wall 101*wb* which is a wall on the +Z direction side. In addition, the main body 101 has a liquid accommodating portion 150 for accommodating the ink as a liquid. The front wall 101*wf* intersects the bottom wall 101*wb*, and is substantially orthogonal to the bottom wall 101*wb* in the present embodiment. The bottom wall 101*wb* of the main body 101 is provided with a liquid supply portion 104 that supplies the liquid in the liquid accommodating portion 150 to the carriage 30, when the cartridge 100 is mounted in the mounting portion 4 of the carriage 30. The liquid supply portion 104 communicates with the liquid accommodating portion 150. An opening 104*op* of the liquid supply portion 104 is sealed by a film 104*f*. By mounting the cartridge 100 in the carriage 30, the film 104*f* is broken, and the liquid introduction portion 6 of the carriage 30 illustrated in FIG. 6 is inserted into the liquid supply portion 104. The ink accommodated in the liquid accommodating portion 150 is supplied to the print head 5 of the printing device 20 via the liquid introduction portion 6. As the ink in the liquid accommodating portion 150 is consumed, air is introduced from an atmosphere-opening hole (not illustrated) in the liquid accommodating portion 150.

Here, a film surface sealed by the film 104*f* is an opening end of the liquid supply portion. The Z direction is a direction perpendicular to the opening end of the liquid supply portion 104. The +Z direction is the same as a direction of the opening of the liquid supply portion 104. The X direction is an arrangement direction of the plurality of cartridges 100A to 100D which are mounted in the carriage 30, and is a width direction of the cartridge 100. In the present embodiment, the Z direction is a direction along the gravity direction, the +Z direction is the gravity direction, and the −Z direction is the anti gravity direction. A direction in which the cartridge 100 is mounted in the carriage 30 of the printing device 20 is defined as a mounting direction MD, and a direction including components of the mounting direction MD is defined as a first direction FD. In the present embodiment, the mount in direction MD and the first direction. FD are the same direction, which are the +Z direction. In other embodiments, the mounting direction MD and the first direction FD may not be the same direction. The first direction FD is a straight direction, and is the direction of the opening of the liquid supply portion 104 in the present embodiment. The first direction FD is a direction substantially along a surface 120*fa* of the circuit board 120. In other embodiments, when the surface 120*fa* is inclined to the mounting direction MD, the mounting direction MD and the first direction FD are different directions, rather than the same direction.

The circuit board 120 is attached to the front wall 101*wf* of the main body 101. The circuit board 120 includes a terminal group 290 composed of a plurality of terminals. In the present embodiment, nine terminals constituting the terminal group 290 are provided. Details of the terminal group 290 will be described below.

The cartridge 100 can be reused. That is, the cartridge 100 is manufactured, that is, reused by completing consumption of the accommodated liquid by the printing device 20 to be zero or a predetermined threshold or less, and then collecting the cartridge 100 by a manufacturer, for example, and filling the liquid in the liquid accommodating portion 150 again. When the liquid is refilled into the liquid accommodating portion. 150 of the cartridge 100, at least a part of information stored in a memory of the circuit board 120 is also rewritten. Details of the memory will be described below.

Figure 4:
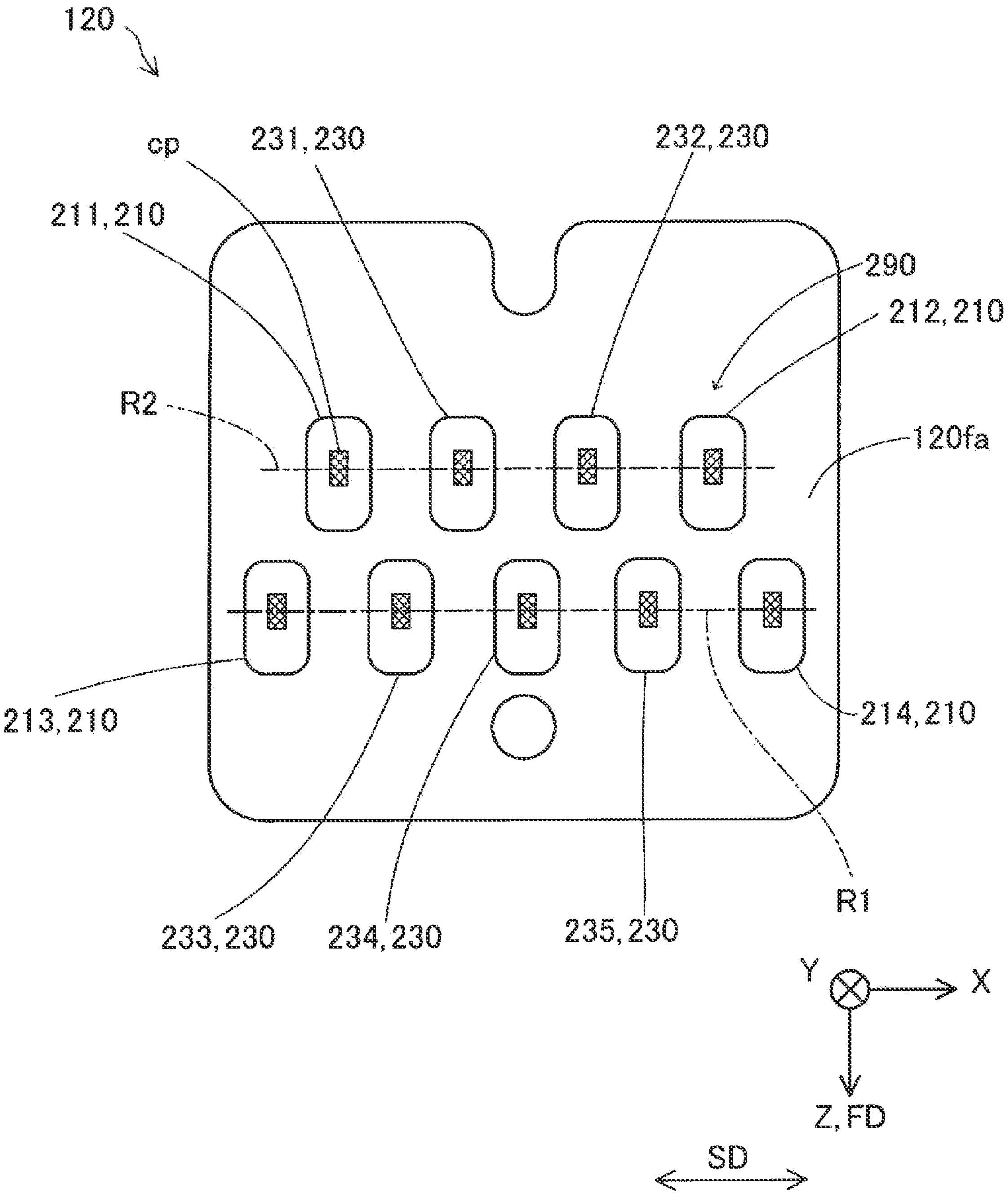
FIG. 4 is a first view illustrating a configuration of a circuit board according to the present embodiment.
Figure 5:
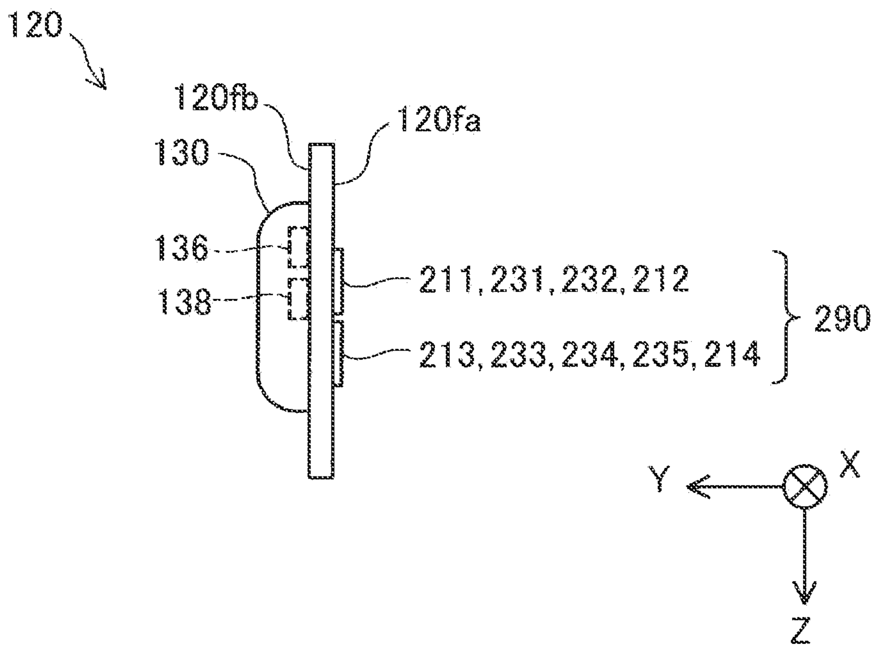
FIG. 5 is a second view illustrating the configuration of the circuit board.

FIG. 4 is a first view illustrating a configuration of the circuit board 120 according to the present embodiment. FIG. 5 is a second view illustrating the configuration of the circuit board 120. The circuit board 120 is provided with the terminal group 290 on the surface 120*fa* as illustrated in FIG. 4, and a non-volatile memory 130 on a rear surface 120*fb* as illustrated in FIG. 5. As illustrated in FIG. 4, the terminal group 290 includes a memory terminal group 230 and a mounting detection terminal group 210.

The memory terminal Group 230 is a terminal for the memory 130. The memory terminal group 230 includes a data terminal 235, a clock terminal 232, a power supply terminal 233, a reset terminal 231, and a ground terminal 234. The data terminal 235 is used to transmit and receive various data between the memory 130 and the printing device 20, such as ink color data or consumption data for a consumption of the liquid accommodated in each cartridge 100.

The mounting detection terminal group 210 includes a first detection terminal 211, a second detection terminal 212, a third detection terminal 213, and a fourth detection terminal 214. Four detection terminals 211 to 214 are disposed at four corners of a set of the memory terminal groups 230, respectively.

Each of the terminals 211, 212, 213, 214, 231, 232, 233, 234, and 235 is formed in a substantially rectangular shape, and disposed to be formed in two rows perpendicular to the first direction FD. That is, a direction of two rows is parallel to a second direction SD that is perpendicular to the first direction FD. A direction in which two rows are arranged is a direction, along the first direction FD. Among the two rows, a row located toward the first direction FD is referred to as a first row R1, and a row located on an opposite side of the first direction FD is referred to as a second row R2. A contact point cp that comes into contact with a device terminal described below is present at a center of each of the terminals 211, 212, 213, 214, 231, 232, 233, 234, and 235.

Each of the terminals 211, 212, 213, 214, 231, 232, 233, 234, and 235 of the terminal group 290 is coupled to the memory 130 via a through-hole disposed in a wiring pattern layer (not illustrated) on a front/rear surface of the circuit board 120 or the circuit board 120.

The memory 130 illustrated in FIG. 5 is a NAND flash memory. In other embodiments, the memory 130 may be a memory such as a NOR flash memory or EEPROM. The memory 130 includes a memory control unit 136 and a storage unit 138 composed of a plurality of memory cells. Each memory cell constituting the storage unit 138 can store data of 1 bit. In addition, the memory 130 can perform data communication with the device control unit 40 of the printing device 20.

Figure 7:
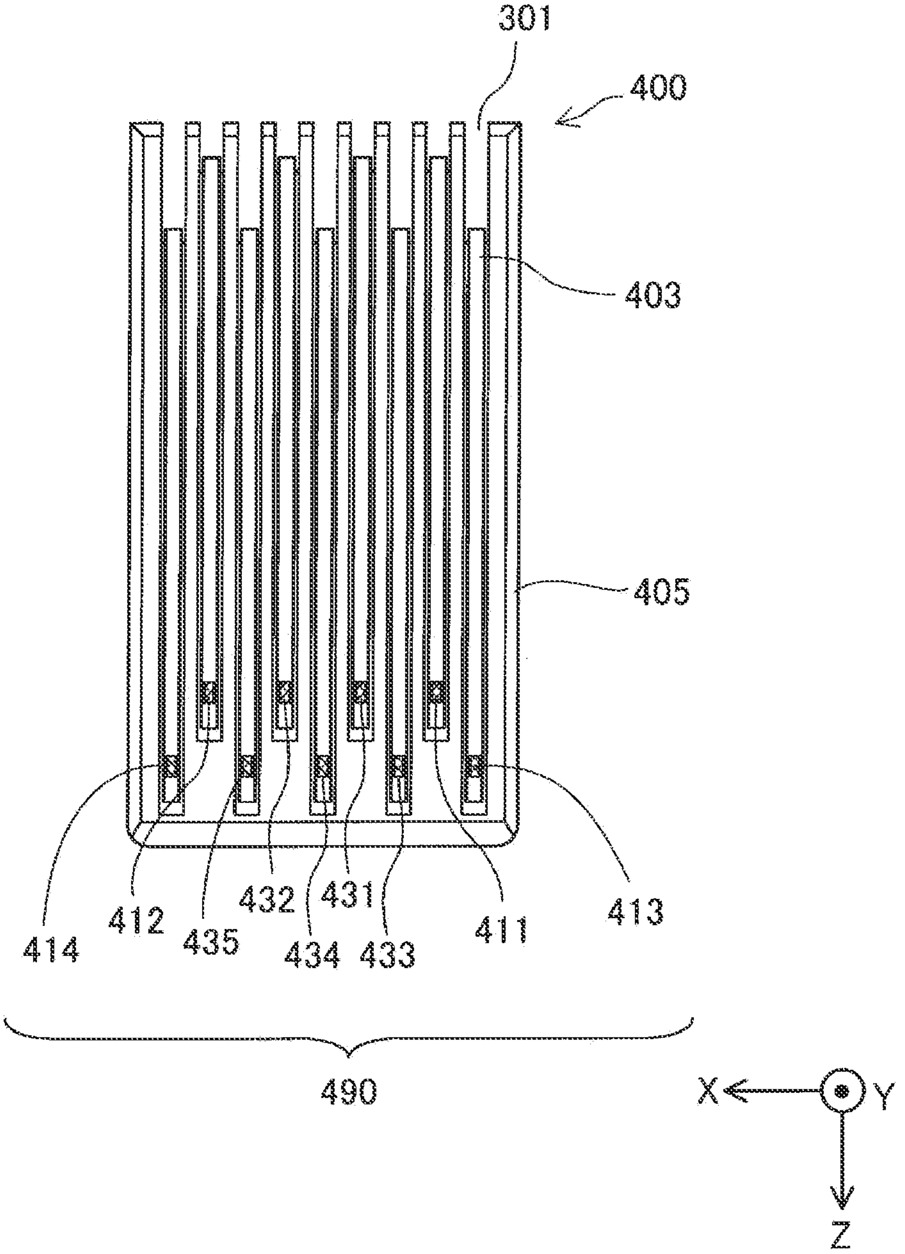
FIG. 7 is a first view illustrating a connection mechanism.
Figure 8:
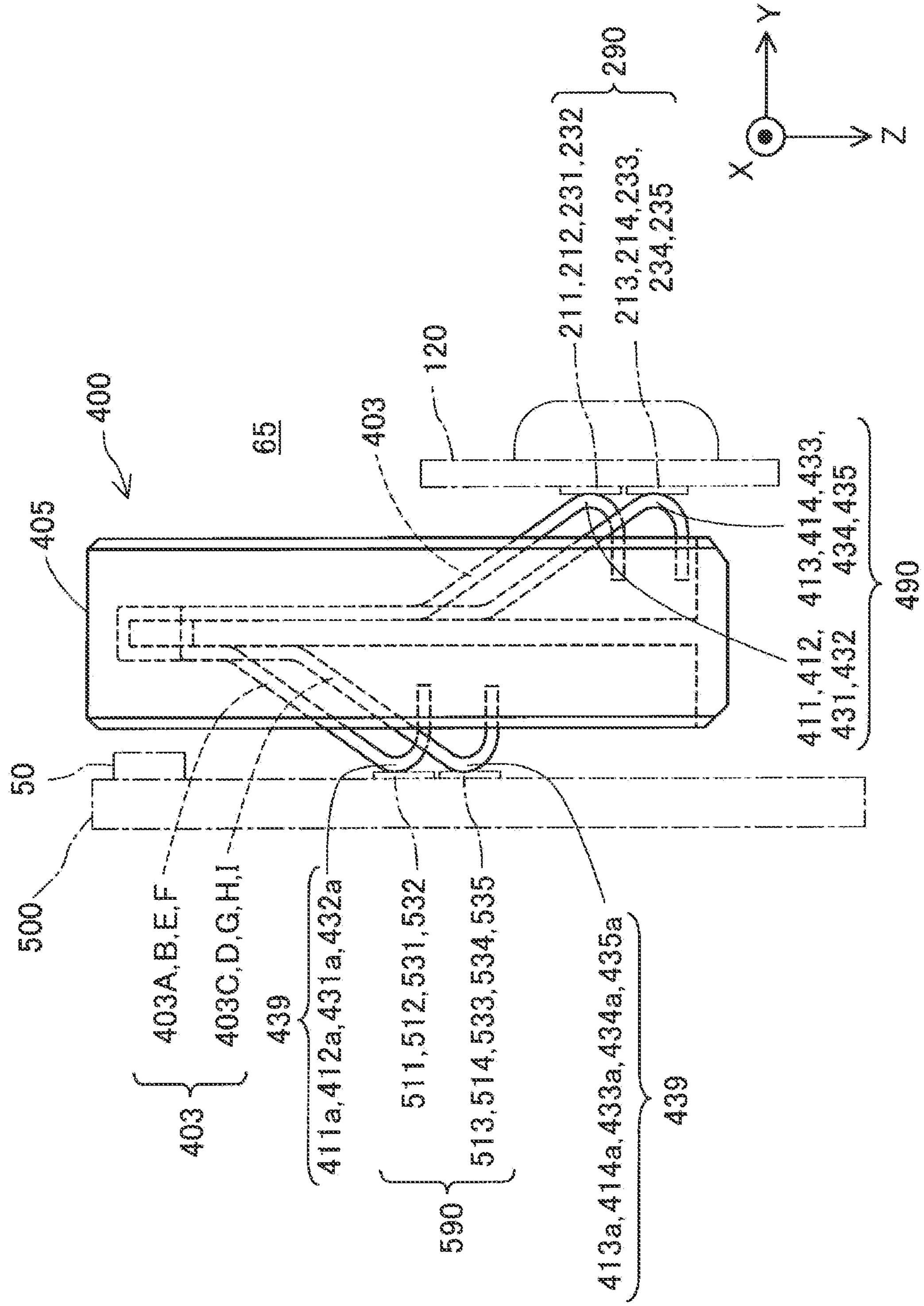
FIG. 8 is a second view illustrating the connection mechanism.

FIG. 6 is a diagram illustrating a state in which the cartridge 100 is mounted in the mounting portion 4 of the carriage 30. FIG. 7 is a first view illustrating the connection mechanism 400. FIG. 8 is a second view illustrating the connection mechanism 400.

As illustrated in FIG. 6, the carriage 30 includes the mounting portion 4, the print head 5, the liquid introduction portion 6, the connection mechanism 400, and the sub-control board 500. The mounting portion 4 forms a mounting chamber 65 for mounting the cartridge 100. The print head 5 includes a plurality of nozzles and a plurality of piezoelectric elements, and discharges ink droplets from each nozzle according to a voltage applied to each piezoelectric element to form dots on the printing medium PA. The liquid introduction portion 6 is disposed on the print head 5 and supplies the ink from the cartridge 100 to the print head 5. In the present embodiment, six liquid introduction portions 6 are provided in response to the number of the cartridges 100A to 100D. The connection mechanism 400 electrically couples the sub-control board 500 and the circuit board 120 of the cartridge 100. Four connection mechanisms 400 are provided in response to the number of the cartridges 100A to 100D, As illustrated in FIG. 8, the sub-control board 500 has a relay unit 50. The relay unit 50 performs control related to the cartridge 100 in cooperation with the device control unit 40.

As illustrated in FIG. 6, the cartridge 100 is mounted in the mounting portion 4 of the printing device 20 by being inserted in the mounting direction MD. In this manner, the cartridge 100 is detachably mounted in the printing device 20. Further, when the cartridge 100 is correctly mounted in the printing device 20, the circuit board 120 is electrically coupled to the device control unit 40 of the printing device 20 via the connection mechanism 400, the sub-control board 500, or the bus 46.

As illustrated in FIG. 7, the connection mechanism 400 includes a terminal holding portion 405 and a plurality of contact point forming members 403 held by the terminal holding portion 405 and having conductivity and elasticity. The terminal holding portion 405 has a plurality of slits 301. The contact point forming member 403 is fitted into the slit 301. In the present embodiment, for each connection mechanism 400, nine contact point, forming members 403 are provided, which is the same as the number of the terminals of the terminal group 290.

As illustrated in FIG. 8, the contact point forming member 403 is a member that electrically couples the terminal group 290 and a board terminal 590 of the sub-control board 500. The board terminal 590 is provided in each mounting chamber 65. In addition, nine board terminals 590 are provided in response to the number of the terminal groups 290. When the nine board terminals 590 are used in a distinguished manner, reference signs "511", "512", "513", "514", "531", "532", "533", "534", and "535" are used, respectively. In the contact point forming member 403, a part protruding toward the mounting chamber 65 forms a device terminal 490 that comes into contact with the terminal group 290. Further, in the contact point forming member 403, a part protruding toward the sub-control board 500 forms a relay terminal 439 that comes into contact with the board terminal 590. When the nine contact point forming members 403 are used in a distinguished manner, "A" to "I" are added to the ends of the reference signs thereof, respectively. Further, when the nine device terminals 490 are used in a distinguished manner, reference signs "411", "412", "413", "414", "431", "432", "433", "434", and "435" are used, respectively. Further, when the nine relay terminals 439 are used in a distinguished manner, reference signs "411*a*", "412*a*", "413*a*", "414*a*", "432*a*", "433*a*", "434*a*", and "435*a*" are used, respectively. Further, when the nine board terminals 590 are used in a distinguished manner, reference signs "511", "512", "513", "514", "531", "532", "533", "534", and "535" are used, respectively.

A contact point forming member 403A including the device terminal 411 and the relay terminal 411*a* electrically couples the first detection terminal 211 and a board terminal 511. A contact point forming member 403B including the device terminal 412 and the relay terminal 412*a* electrically couples the second detection terminal 212 and a board terminal 512. A contact point forming member 4035 including the device terminal 413 and the relay terminal 413*a* electrically couples the third detection terminal 213 and a board terminal 513. A contact point forming member 403D including the device terminal 414 and the relay terminal 414*a* electrically couples the fourth detection terminal 214 and a board terminal 514. A contact point forming member 4035 including the device terminal 431 and the relay terminal 431*a* electrically couples the reset terminal 231 and a board terminal 531. A contact point forming member 403F including the device terminal 432 and the relay terminal 432*a* electrically couples the clock terminal 232 and a board terminal 532. A contact point forming member 403G including the device terminal 433 and the relay terminal 433*a* electrically couples the power supply terminal 233 and a board terminal 533. A contact point forming member 403H including the device terminal 434 and the relay terminal 434*a* electrically couples the ground terminal 234 and a board terminal 534. A contact point forming member 403I including the device terminal 435 and the relay terminal 435*a* electrically couples the data terminal 235 and a board terminal 535.

Figure 9:
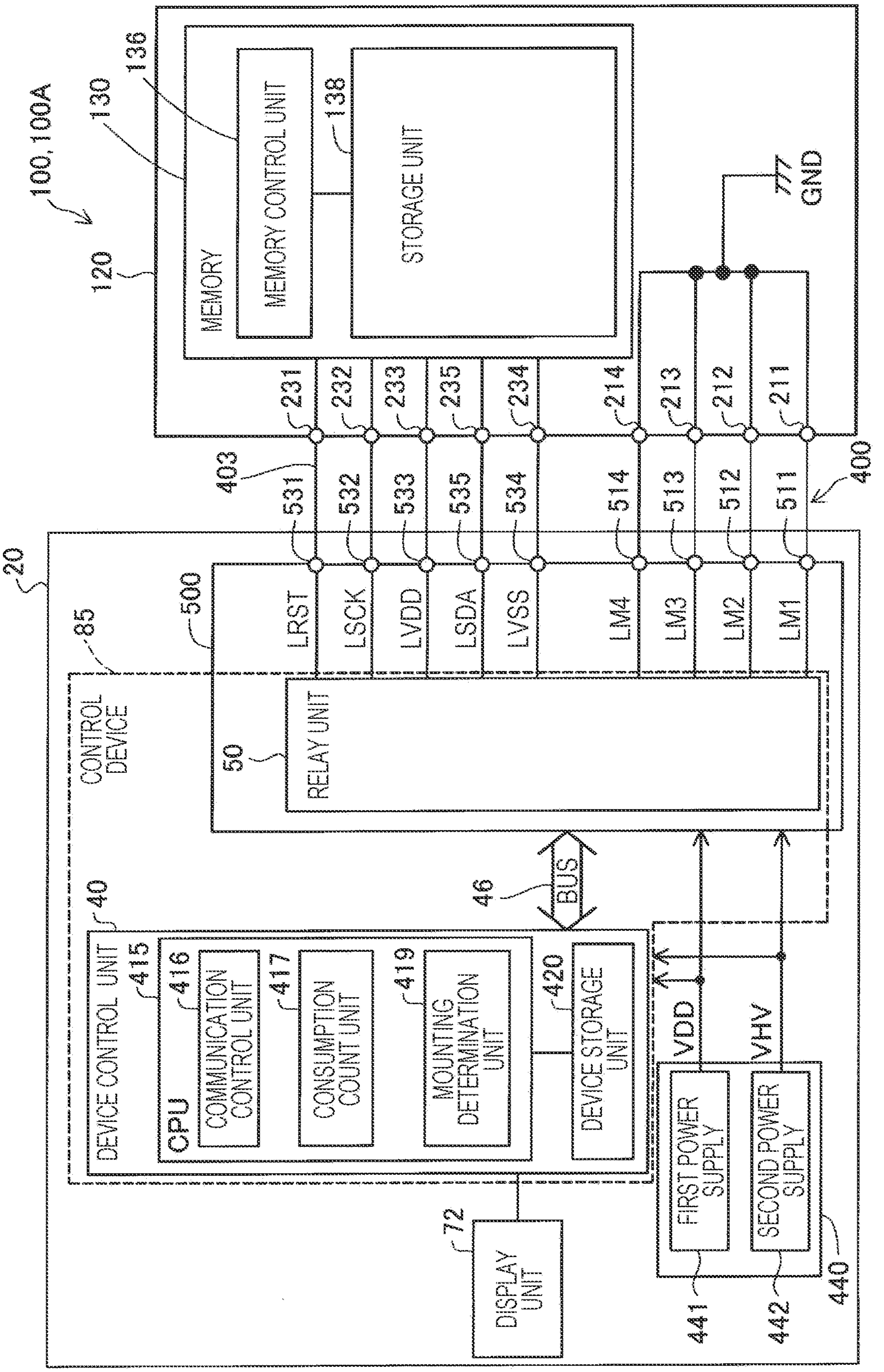
FIG. 9 is a diagram illustrating a configuration of a printing device together with a single cartridge.
Figure 10:
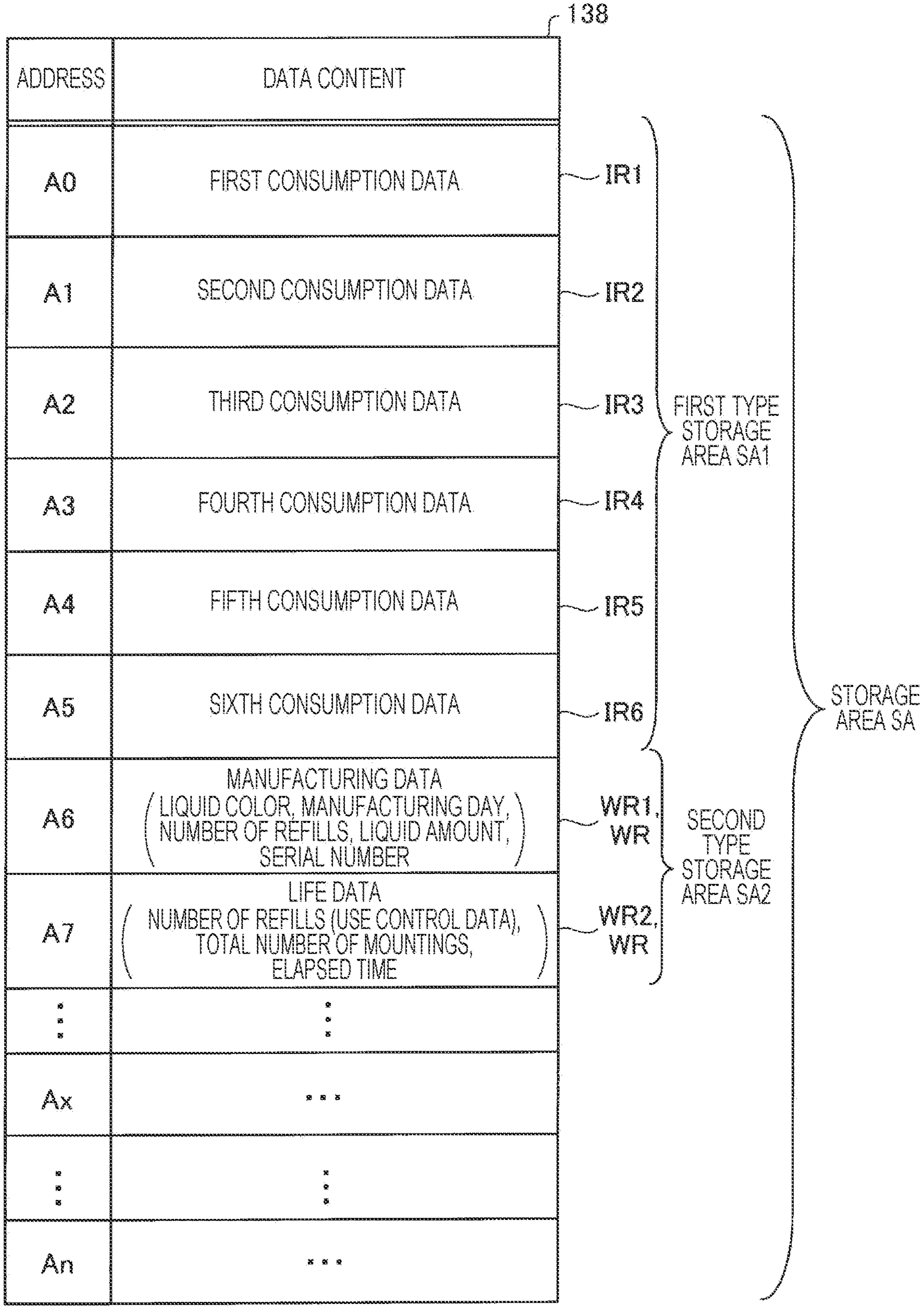
FIG. 10 is a diagram for explaining a storage unit.
Figure 11:
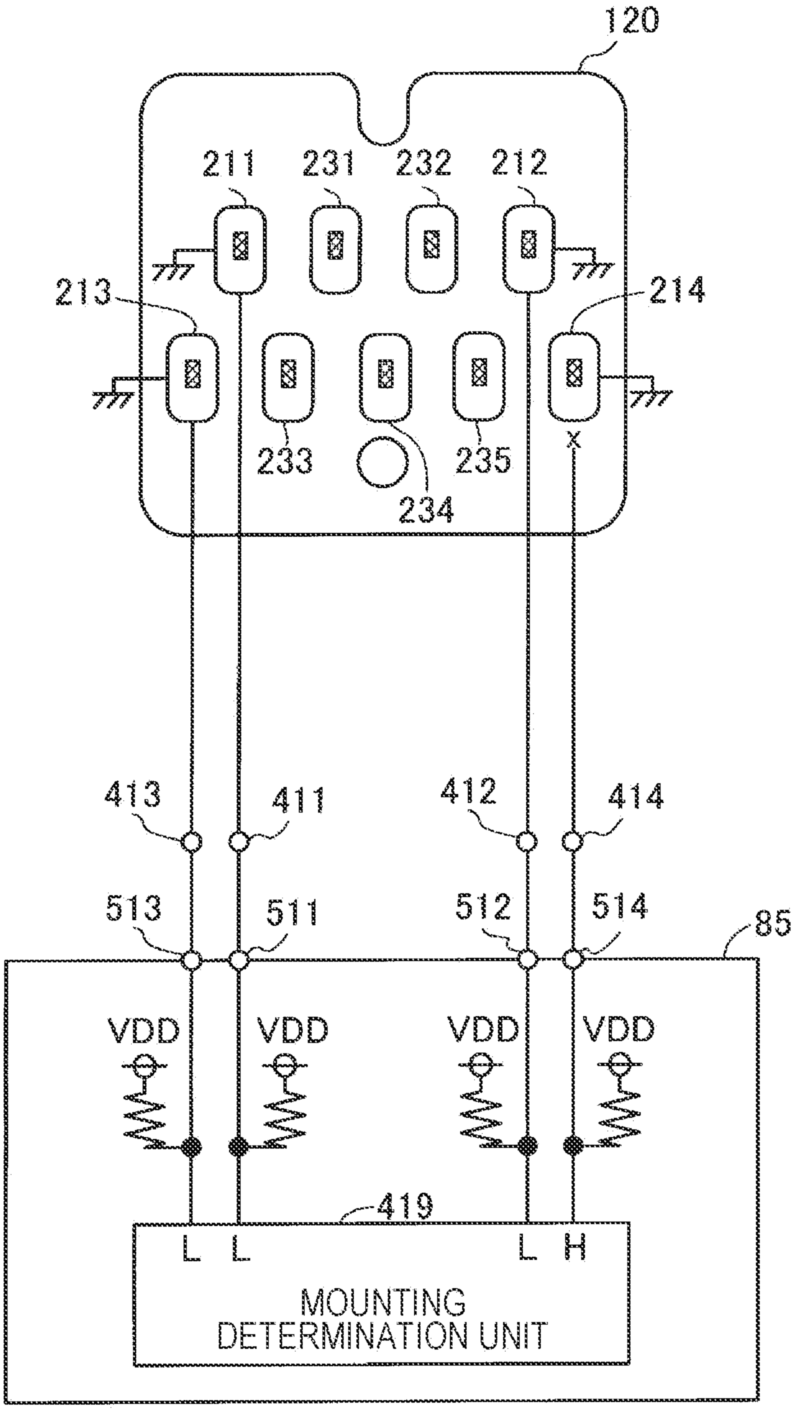
FIG. 11 is a diagram for explaining mounting determination.

FIG. 9 is a diagram illustrating a configuration of the printing device 20 together with a single cartridge 100. FIG. 10 is a diagram for explaining the storage unit 138. FIG. 11 is a diagram for explaining mounting determination.

As illustrated in FIG. 9, the memory 130 of the circuit board 120 includes the memory control unit 136 and the storage unit 138. The memory control unit 136 controls an operation of the memory 130. For example, the memory control unit 136 performs a writing operation or a reading operation of data to the storage unit 138 in response to a command transmitted from the printing device 20.

As illustrated in FIG. 10, the storage unit 138 has a storage area SA composed of a plurality of memory cells specified by addresses A0 to An. The storage area SA includes a first type storage area SA1 specified by the addresses A0 to A5, and a second type storage area SA2 specified by the addresses A6 to Ax. Each of the first type storage area SA1 and the second type storage area SA2 is a rewritable area, and is set to enable data rewriting in which the already stored data is erased and new data is written, in addition to the data reading. The memory control unit 136 specifies an address of the rewritable area and an address of a read-only area in advance to set the rewritable area and the read-only area.

The first type storage area SA1 has a plurality of individual areas IR1 to IR6 specified by different addresses. In the plurality of individual areas IR1 to IR6, a different area is used in each one-time use period of the cartridge 100. The one-time use period is a period in which after the liquid is filled into the cartridge 100, the cartridge 100 is mounted in the printing device 20 and consumes the liquid, and a residual amount of the liquid in the cartridge 100 is thus zero or a predetermined threshold or less, that is, a period until consumption of the liquid is completed. The number of each of the individual areas IR1 to IR6 is set to the presumed number of fills or more of the liquid into the cartridge 100. In the present embodiment, the cartridge 100 presumes six fillings in total, that is, one filling of initial filling and five refills for reuse. Thus, the number of individual areas IR1 to IR6 is set to six. The presumed number of refills of the liquid into the cartridge 100 is set in consideration of a period to life of the cartridge 100 as a product, predicted based on, for example, wear due to detachment of the cartridge 100 from the mounting portion 4, deterioration over time, and the like.

The first individual, area IR1 is specified by the address A0. The second individual area IR2 is specified by the address A1. The third individual area IR3 is specified by the address A2. The fourth individual area IR4 is specified by the address A3. The fifth individual area IR5 is specified by the address A4. The sixth individual area IR6 is specified by the address A5. Each of the individual areas IR1 to IR6 stores consumption data for a consumption CA the liquid filled into the cartridge 100 in a one-time use period of the cartridge. The consumption data is a value indicating a ratio[%] of an amount of consumed ink[mg] to an initial filling amount of ink[mg] before consumption. The consumption data is a value indicating "0" in an initial state of the cartridge 100 into which the liquid is filled, and is a value indicating "100" when the liquid in the cartridge 100 is consumed and a residual amount thereof is zero. Any consumption data stored in the individual areas IR1 to IR6 of the addresses A0 to A5 specified according to the number of uses of the cartridge 100 is updated by transmitting a command for writing the consumption data from the control device 85 of the printing device 20 to the memory control unit 136 of the cartridge 100 to be written, every time a predetermined amount or more of the liquid is consumed from the cartridge 100 by a printing operation or a cleaning operation of the printing device 20.

In the individual areas IR1 to IR6, a different address, that is, a different area is used at a different time of use such as at the time of initially using or reusing the cartridge 100. In the present embodiment, the first individual area IR1 to the sixth individual area IR6 are sequentially used, in the order of the sixth use period after the completion of the fifth refill from the initial use period. The first individual, area IR1 stores first consumption data as consumption data in the initial use period. The second individual area IR2 stores second consumption data as consumption data in the second use period. The third individual area IR3 stores third consumption data as consumption data in the third use period. The fourth individual area IR4 stores fourth consumption data as consumption data in the fourth use period. The fifth individual area IR5 stores fifth consumption data as consumption data in the fifth use period. The sixth individual area IR6 stores sixth consumption data as consumption data in the sixth use period. As described above, for die data in the first type storage area SA1, the same type of data, even the same consumption data in the present embodiment, is stored in an area having a different address every time the liquid is filled into the cartridge 100, and is rewritten.

The second type storage area SA2 has a plurality of writing areas WR used in the entire use period of the cartridge 100, which is a set of the one-time use periods of the cartridge 100. In more detail, the second type storage area SA2 has a first writing area WR1 and a second writing area WR2.

When the liquid is filled into the cartridge 100, the first writing area WR1 is an area in which new first data is written after erasing first past data that has been already written. That is, the first writing area WR1 is an area in which the data that has been written in the past is cleared to zero and reused. The first past data written in the first writing area WR1 or data as the first data is data having a lower writing frequency than a writing frequency of the data in the first type storage area SA1, and includes data generated regardless of the past data every time the liquid is filled into the cartridge 100. For example, in the present embodiment, the data written in the first writing area WR1 is manufacturing data for manufacturing the cartridge 100. The manufacturing data is data generated regardless of the past data, and data for manufacturing the cartridge 100, generated every time the liquid is filled into the cartridge 100. The manufacturing data has, for example, liquid color data indicating a color of the liquid filled into the cartridge 100, data indicating a manufacturing day of the cartridge 100, data indicating an amount of the liquid filled into the cartridge 100, and data indicating a serial number for identifying the cartridge 100. The manufacturing day of the cartridge 100 is an initial manufacturing day when the cartridge 100 is filled with the liquid and manufactured, particularly, an initial manufacturing date, but instead of or in addition to this, may be a day when the cartridge 100 is refilled with the liquid and manufactured again. The manufacturing data is not limited to the items described above, and some of the above items may be omitted, or the manufacturing data may include other items. When the data indicating the manufacturing day is only data indicating the initial manufacturing day, the data indicating the manufacturing day is a fixed value regardless of the number of fills of the cartridge, and thus the data indicating the manufacturing day may be written into an area different from the first writing area WR1. Further, the first writing area WR1 has a plurality of individual first writing areas specified by a plurality of addresses, and each item of the manufacturing data may be allocated and written into each of the plurality of individual first writing areas.

When the liquid is filled into the cartridge 100, the second writing area WR2 is an area in which new second data is written and updated based on second past data that has been already written. That is, the second writing area WR2 is an area in which the data is accumulated and used when refilling the cartridge 100. The second past data written in the second writing area WR2 or data as the second data is data having a lower writing frequency than a writing frequency of the data in the first type storage area SA1, and is life data for life of the cartridge 100. For example, in the present embodiment, the life data written into the second writing area WR2 is number-of-refills data indicating the number of refills which is the number of times of refills, total-number-of-mountings data indicating the total number of mountings which is a total value of the number of mountings of the cartridge 100 into the mounting portion 4 until the current time since the initial manufacturing, and elapsed time data indicating elapsed time since the initial manufacturing day of the cartridge 100 that represents a day when the cartridge 100 is initially filled with the liquid and manufactured.

In the number-of-refills data, a value indicating zero is stored when initially filling the liquid into the cartridge, that is, when initially manufacturing the cartridge 100, and is updated by a manufacturer at each time of remanufacturing the cartridge 100 so that the value is increased by 1 every time the liquid is refilled. The number-of-refills data is data for life because it is set in consideration of the period to life of the cartridge 100 as a product as described above.

The total-number-of-mountings data is added up one by one and updated by transmitting a write command from the device control unit 40 of the printing device 20 to the memory 130 of the target cartridge 100, every time a mounting determination unit 419 determines that the cartridge 100 is mounted in the mounting portion 4 in the entire use period of the cartridge 100. The cartridge 100 is mounted in or detached from the mounting portion 4, resulting in deterioration of components of the cartridge 100 such as the circuit board 120 due to rubbing against the mounting portion 4. Thus, the data indicating the total-number-of-mountings is the data for life.

The elapsed time data is data that is stored in the storage unit 138 and updated at each time when a certain period has elapsed from the initial manufacturing day, for example, data indicating the number of years that has elapsed from the initial manufacturing day. The elapsed time data is updated by the device control unit 40 of the printing device 20 by the following steps, for example. First, the device control unit 40 acquires data indicating the initial manufacturing day and the elapsed time from the memory 130. Then, the device control unit 40 compares the initial manufacturing day and the current date by a timer. When update from data indicating current elapsed time is required, for example, when the time elapses over a year from the previous update, the device control unit. 40 transmits the write command to the memory 130 to update the elapsed time data in the storage unit 138. The elapsed time data is the data for life because it has correlation with deterioration of the cartridge 100 over time. The second writing area WR2 has a plurality of individual second writing areas specified by a plurality of addresses, and the data indicating the number of refills, the total-number-of-mountings data, and the data indicating the elapsed time may be allocated and written into each of the plurality of individual second writing areas.

As described above, in the data stored in the second type storage area SA2, the same type of data is stored and rewritten in an area having the same address in the entire use period of the cartridge 100. In addition, as described above, the second type storage area SA2 stores the manufacturing data for manufacturing the cartridge that is generated every time the liquid is filled into the cartridge 100, and the life data including the total-number-of mountings data of the cartridge 100 in the printing device. In addition, as described above, the first writing area WR1 and the second writing area WR2 can be used properly according to a type of writing data in the second type storage area SA2. Specifically, the manufacturing data is stored in the first writing area WR1 as the first data, and the life data including the total-number-of-mountings data or the elapsed time data is stored in the second writing area WR2 as the second data.

The storage unit 138 of the memory 130 stores use control data that is used to determine a use individual area to be used in a one-time use period among the plurality of individual areas IR1 to IR6 by the printing device 20. The use control data is updated by a manufacturer every time the liquid is filled into the cartridge 100. In the present embodiment, the use control data is the number-of-refills data. A value of the use control data and the individual areas IR1 to IR6 to be used are associated with each other. For example, when the number-of-refills data as the use control data is a value indicating zero, the printing device 20 writes the consumption data using the first individual area IR1 that is specified by the address A0. In addition, for example, when the number-of-refills data as the use control data is a value indicating "1", the printing device 20 writes the consumption data using the second individual area IR2 that is specified by the address A1. The details of a determination process of the writing area of the consumption data will be described. In other embodiments, the use control data may be data different from the number-of-refills data, and may be stored in the first type storage area SA1, the second type storage area SA2, and an area other than the areas thereof.

As illustrated in FIG. 9, the sub-control board 500 includes a reset signal line LRST, a clock signal line LSCK, a power supply signal line LVDD, a data signal line LSDA, a ground signal line LVSS, a first detection signal line LM1, a second detection signal line LM2, a third detection signal line LM3, and a fourth detection signal line LM4. The reset signal line LRST electrically couples the relay unit 50 and the board terminal 531. The clock signal line LSCK electrically couples the relay unit 50 and the board terminal 532. The power supply signal line LVDD electrically couples the relay unit 50 and the board terminal 533. The ground signal line LVSS electrically couples the relay unit 50 and the board terminal 534. The data signal line LSDA electrically couples the relay unit 50 and the board terminal 535. The first detection signal line EMI to the fourth detection signal line LM4 electrically couple the relay unit 50 and the board terminals 511 to 514. The relay unit 50 is composed of a CPU, a storage device, or the like, and relays data or power supplied via the bus 46 or the power supply line to transmit the data or the power to the cartridge 100. In other embodiments, the relay unit 50 may have some functions (described below) of the device control unit 40.

The printing device 20 includes the above-described display unit 72, a power supply 440, and the control device 85. The control device 85 includes the device control unit 40 and the relay unit 50. The power supply 440 includes a first power supply 441 generating a first power supply voltage VDD and a second power supply 442 generating a second power supply voltage VHV. The first power supply voltage VDD is a general power supply voltage used in a logic circuit, and a rating thereof is 3.3 V. The second power supply voltage VHV is a high voltage used for driving the print head 5 and discharging ink, and a rating thereof is, for example, 42 V. The voltages VDD and VHV are supplied to the sub-control board 500, and is also supplied to the components such as other circuits, as needed.

The device control unit 40 includes a CPU 415 and a device storage unit 420. The CPU 415 executes various programs stored in the device storage unit 420 to control operations of the printing device 20. For example, the device control unit 40 controls an operation of the display unit 72 or controls an operation of the relay unit 50. In addition, the CPU 415 executes various programs stored in the device storage unit 420 to function as a communication control unit 416, a consumption count unit 417, and a mounting determination unit **41*q*. At least some functions of the CPU 415** are not limited to software, and may be composed of hardware such as a circuit.

The communication control unit 416 exchanges data with the memory control unit 136 of the memory 130 via the bus 46 and the data signal line LSDA. For example, the communication control unit 416 exchanges data with the memory control unit 136 by transmitting a read command for reading the data from the memory 130 to the target memory control unit 136, or transmitting the write command for writing the data into the memory 130 to the target memory control unit 136.

The consumption count unit 417 calculates a consumption of the liquid of each of the four cartridges 100A to 100D. For example, when the printing operation is performed according to a printing job, the consumption count unit 417 calculates a consumption[mg] by counting dots, that is, counting a discharging operation of ink using each nozzle of the print head 5. A discharge amount of ink is determined in advance by one discharging operation. In addition, for example, when the cleaning operation for sucking the ink from each nozzle of the print head 5 is performed, the consumption count unit 417 calculates a suction amount of ink which is preassociated according to the cleaning operation as a consumption[mg] of the ink. In addition, the consumption count unit 417 calculates a cumulative consumption[mg] of the ink in the one-time use period of the cartridge 100, and calculates a ratio of the cumulative consumption[mg] to a filling amount[mg] of the cartridge 100 as a percentage. Then, the consumption count unit 417 transmits, to the target memory 130, data indicating the calculated ratio and a consumption data write command including an address for specifying the use individual area determined according to the use control data, every time a predetermined amount or more of liquid is consumed from the cartridge 100. As a result, the memory control unit 136 that receives the consumption data write command is updated by writing the consumption data in the specified use individual area of the address.

The mounting determination unit 419 determines whether or not the cartridge 100 is mounted in the mounting portion 4. The first detection terminal 211 to the fourth detection terminal 214 of the circuit board 120 are electrically coupled to the mounting determination unit 419 via the corresponding connection mechanism 400 or the corresponding board terminals 511 to 514. The first detection terminal 211 to the fourth detection terminal 214 of the circuit board 120 are Grounded as illustrated in FIG. 11. Electric wirings for coupling the board terminals 511 to 514 and the mounting determination unit 419 are respectively coupled at the first power supply voltage VDD of a rating of 3.3 V via a pull-up resistance.

In an example illustrated in FIG. 11, the first detection terminal 211 to the third detection terminal 213 among the first detection terminal 211 to the fourth detection terminal 214 of the circuit board 120 are in a good coupling state with the corresponding device terminals 411 to 413. On the other hand, the fourth detection terminal 214 is in a poor contact state with the corresponding device, terminal 414. Voltages of the wirings of three device terminals 411, 412, and 413 in the good coupling state become a low level. On the other hand, a voltage of wiring of the device terminal 414 in the poor coupling state becomes a high level. Accordingly, the mounting determination unit 419 can determine whether or not the contact state of each of the four detection terminals 211, 212, 213, and 214 is good or poor by examining the voltage level of each wiring. In the present embodiment, when the voltage level of the wiring of each of the four device terminals 411 to 414 is the low level, the mounting determination unit 419 determines that the cartridge 100 is correctly mounted, and in other states, determines that the cartridge 100 is not correctly mounted.

Figure 12:
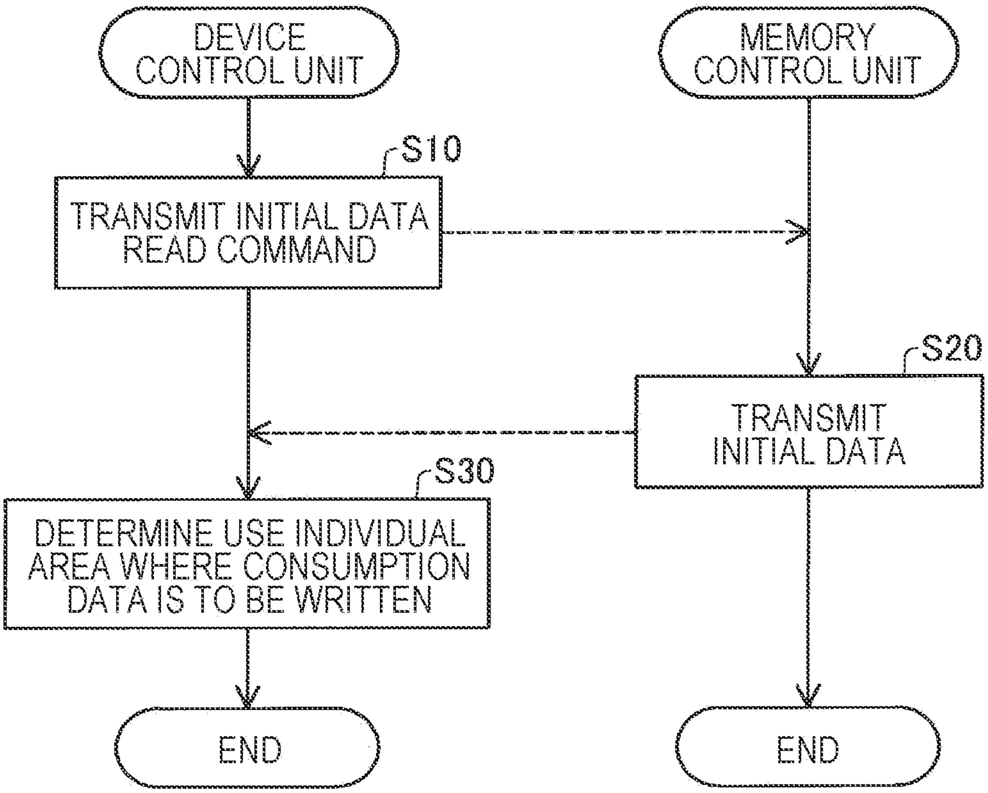
FIG. 12 is a flowchart illustrating a determination process.

FIG. 12 is a flowchart illustrating a determination process of determining a use individual area in which the consumption data is written among the plurality of individual areas IR1 to IR6, The determination process is started with the determination that the cartridge 100 is mounted in the mounting portion 4 by the mounting determination unit 419 as a trigger. First, in step S10, the device control unit 40 transmits an initial data read command to the memory 130 of the cartridge 100 that is determined to be mounted in the mounting portion 4. The initial data read command is a command for reading the manufacturing data and the life data from the memory 130. The initial data read command may be at least a command for reading the number-of-refills data as the use control data.

In step S20, the memory control unit 136 of the memory 130 that receives the initial data read command transmits the manufacturing data and the life data as the initial data of an address specified by the initial data read command to the device control unit 40.

In step S30, the device control unit 40 that receives the initial data determines the use individual area of the storage unit 138 where the consumption data is to be written, based on the number-of-refills data as the use control data included in the initial data. An address for specifying the determined use individual area is stored in the device storage unit 420, and when the consumption data stored in the storage unit 138 of the memory 130 is updated in the one-time use period of the cartridge 100, the address is added to the write command.

According to the above-described embodiment, since the memory 130 has the plurality of individual areas IR1 to IR6 in which a different area is used in each one-time use period of the cartridge 100, the data having the large number of rewritings, for example, even the consumption data, is written and updated by using a different one of the individual areas IR1 to IR6 in each different use period. As a result, when the liquid is refilled, into the cartridge 100, a possibility that the memory 130 is deteriorated can be reduced without replacing the memory 130 with a new one. In addition, according to the present embodiment, the number of the plurality of individual areas IR1 to IR6 is set to the presumed number of fills or more of the liquid into the cartridge 100. As a result, one of the different individual areas IR1 to IR6 in which the data is written and updated can be allocated in each one-time use period over the entire use period of the cartridge 100. Further, it is possible to use the number of refills as the use control data stored in the storage unit 138 to easily determine the use individual area used among the plurality of individual areas IR1 to IR6.

Moreover, according to the above-described embodiment, the second writing area WR2 stores the elapsed time data indicating the elapsed time, as illustrated in FIG. 10. As a result, the elapsed time data can be used to generate information on life of the memory 130 or the cartridge 100 to which the memory 130 is attached. For example, the device control unit 40 of the printing device 20 acquires the elapsed time data from the memory 130, and generates information indicating that the cartridge 100 is deteriorated or almost deteriorated when the elapsed time data indicates a predetermined period or longer. The generated information is then displayed on the display unit 72. Further, according to the above-described embodiment, the second writing area WR2 stores the total-number-of-mountings data. As a result, the total-number-of-mountings data also can be used to generate information on life of the memory 130 or the cartridge 100 to which the memory 130 is attached. For example, the device control unit 40 of the printing device 20 acquires the total-number-of-mountings data from the memory 130, and Generates information indicating that the cartridge 100 is deteriorated or almost deteriorated when the total-number-of-mountings data indicates a predetermined number or more. The generated information is then displayed on the display unit 72.

B. Other Embodiments

B-1. Other Embodiment 1

In the above-described embodiment, the plurality of individual areas IR1 to IR6 are areas in which the consumption data is written, but are not limited thereto, and the consumption data may be other data as long as they are data having the large number of writings in the one-time use period of the cartridge 100. For example, the data written into the plurality of individual areas IR1 to IR6 may be data indicating the number of communications with the printing device 20, instead of or in addition to the consumption data.

B-2. Other Embodiment 2

The present disclosure is not limited to being applied to an ink let printer and a cartridge thereof, and can be applied to a cartridge mounted in any printing device that ejects other liquids except for ink. For example, the present disclosure can be applied to various printing devices and cartridges thereof as follows.

(1) Image recording apparatus such as a fax machine
(2) Printing device that ejects color materials used in manufacturing a color filter for an image display apparatus such as a liquid crystal display
(3) Printing device that ejects electrode materials used in forming electrodes such as an organic electroluminescence (EL) display or field emission display (FED)
(4) Printing device that elects a liquid including bio-organic matters used in manufacture of a biochip
(5) Sample printing device as precision pipette
(6) Printing device of lubricating oil
(7) Printing device of resin liquid
(8) Printing device that ejects lubricating oil to a precision, machine, such as a watch and a camera, with pinpoint accuracy
(9) Printing device that ejects a transparent resin liquid, such as an ultraviolet curable resin liquid, to a substrate to form a micro-hemispherical lens (optical lens) used for an optical communication element or the like
(10) Printing device that ejects an acidic or alkaline etching solution to etch a substrate or the like
(11) Printing device including a liquid electing head that discharges any other minute amount of liquid droplets The "liquid droplets" refer to a state of the liquid discharged from the printing device, and include those having particle-like, tear-like, or thread-like trails. In addition, the "liquid" here may be any material that can be elected by the printing device. For example, the "liquid" may be a material in a state where the substance is in a liquid phase, and liquid materials with high or low viscosity and liquid materials such as sol, gel water, other inorganic solvents, organic solvents, solutions, liquid resins, and liquid metal are also included in the "liquid". In addition, the "liquid" includes not only a liquid as one state of a substance but also a "liquid" obtained by dissolving, dispersing or mixing particles of a functional material made of a solid such as a pigment or metal particles in a solvent. In addition, representative examples of the Liquid include ink and liquid crystal as described in the above embodiment. Here, the ink includes various liquid compositions such as normal water-based ink and oil-based ink, gel ink, and hot-melt ink.

C. Other Aspects

The present disclosure is not limited to the above described embodiment, and can be realized with various configurations without departing from the sprit of the present disclosure. For example, the technical features of the embodiments corresponding to the technical features in each embodiment described below can be appropriately replaced or combined to solve some or all of the above-described problems, or to achieve some or all of the above effects. In addition, when the technical feature is not described as essential in the present specification, it can be deleted as appropriate. In addition, when the technical feature is not described as essential in the present specification, it can be appropriately deleted.

(1) According to a first aspect of the present disclosure, there is provided a memory attached to a cartridge that is configured to be reusable by completing consumption of a liquid and then filling the liquid thereinto again. The memory includes: a first type storage area used in a one-time use period from when the liquid is filled into the cartridge to when the consumption of the liquid is completed; and a second type storage area used in an entire use period of the cartridge, which is a set of one-time use periods, in which the first type storage area has a plurality of individual areas in which a different area is used in each one-time use period. There is provided a memory attached to a cartridge that is configured to be reusable by completing consumption of a liquid and then filling the liquid thereinto again. According to the aspect, since the memory has the plurality of individual areas in which a different area is used in each one-time use period, the data is written and updated by using a different individual area in each different use period even if it is data having the large number of rewritings. As a result, when the liquid is refilled into the cartridge, a possibility that the memory is deteriorated can be reduced without replacing the memory with new one.

(2) In the aspect, the second type storage area may have a first writing area in which new first data is written after first past data that has been already written is erased when the liquid is refilled into the cartridge, and a second writing area in which new second data is written and updated based on second past data that has been already written when the refilling is performed. According to the aspect, the first writing area and the second writing area can be used properly according to a type of writing data in the second type storage area.

(3) In the aspect, the second type storage area may store manufacturing data for manufacturing the cartridge, generated every time the liquid is filled into the cartridge and total-number-of-mountings data of the cartridge in a printing device in the entire use period, the manufacturing data may be stored in the first writing area as the first data, and the total-number-of-mountings data may be stored in the second writing area as the second data. According to the aspect, the manufacturing data generated for each filling of the liquid can be stored in the first writing area, and the total-number-of-mountings data in which the number of mountings is accumulated can be stored in the second writing area.

(4) In the aspect, the second writing area may further store elapsed time data indicating elapsed time since an initial manufacturing day that represents a day when the cartridge is initially filled with the liquid and manufactured. According to the aspect, the elapsed time data can be used to generate information on life, of the memory or the cartridge to which the memory is attached.

(5) In the aspect, the number of the plurality of individual areas may be set to a presumed number of fills or more of the liquid into the cartridge. According to the aspect, a different individual area in which the data is written, and updated can be allocated in each one-time use period over the entire use period of the cartridge.

(6) In the aspect, use control data that is used to determine a use individual area to be used in a one-time use period among the plurality of individual areas may be stored. According to the aspect, the use individual area can be easily determined using the use control data.

(7) In the aspect, the use control data may be number-of-refills data indicating the number of refills of the liquid in the cartridge stored in the second type storage area. According to the aspect, the number-of-refills data can be used as the use control data.

(8) Each of the plurality of individual areas may store consumption data for a consumption of the liquid filled into the cartridge in the one-time use period. According to the aspect, the consumption data can be stored in the individual area.

(9) According co a second aspect of the present disclosure, there is provided a cartridge. The cartridge includes: a liquid accommodating portion accommodating a liquid; a liquid supply portion supplying the liquid in the liquid accommodating portion; and the memory described in the aspect. According to the aspect, since the memory has the plurality of individual areas in which a different area is used in each one-time use period, the data is written and updated by using a different individual area in each different use period even if it is data having the large number of rewritings. As a result, when the liquid is refilled into the cartridge, a possibility that the memory is deteriorated can be reduced without replacing the memory with new one.

In addition to the aspects described above, the present disclosure can be realized as aspects such as a method for manufacturing a memory, and a printing system including a cartridge and a printing device, and a method for controlling a printing system.

What is claimed is:

1. A non-transitory memory attached to a cartridge that is configured to be reusable by completing consumption of a liquid and then filling the liquid thereinto again, the memory comprising:

a first type storage area used in a one-time use period from when the liquid is filled into the cartridge to when the consumption of the liquid is completed; and a second type storage area used in an entire use period of the cartridge, which is a set of one-time use periods, wherein the first type storage area has a plurality of individual areas in which a different area is used in each one-time use period, different ones of the plurality of individual areas occupy different parts of the first type storage area and are used to record information of liquid consumption in different one-time use periods, and consumption data stored in an individual area is updated every time when a predetermined amount or more of the liquid in the corresponding one-time use is consumed.

2. The non-transitory memory according to claim 1, wherein the second type storage area has a first writing area in which new first data is written after first past data that was already written is erased when the liquid is refilled into the cartridge, and a second writing area in which new second data is written and updated based on second past data that was already written when the refilling is performed.

3. The non-transitory memory according to claim 2, wherein the second type storage area stores manufacturing data for manufacturing the cartridge, generated every time the liquid is filled into the cartridge and total-number-of-mountings data of the cartridge in a printing device in the entire use period, the manufacturing data is stored in the first writing area as the first data, and the total-number-of-mountings data is stored in the second writing area as the second data.

4. The non-transitory memory according to claim 3, wherein the second writing area further stores elapsed time data indicating elapsed time since an initial manufacturing day that represents a day when the cartridge is initially filled with the liquid and manufactured.

5. The non-transitory memory according to claim 1, wherein the number of the plurality of individual areas is set to a presumed number of fills or more of the liquid into the cartridge.

6. The non-transitory memory according to claim 1, wherein use control data that is used to determine a use individual area to be used in a one-time use period among the plurality of individual areas is stored.

7. The non-transitory memory according to claim 6, wherein the use control data is number-of-refills data indicating the number of refills of the liquid in the cartridge stored in the second type storage area.

8. The non-transitory memory according to claim 1, wherein each of the plurality of individual areas stores consumption data for a consumption of the liquid filled into the cartridge in the one-time use period.

9. A cartridge comprising:

a liquid accommodating portion accommodating a liquid;

a liquid supply portion supplying the liquid in the liquid accommodating portion; and the non-transitory memory according to claim 1.

* * * * *